C. W. SCHMIDT.
MEANS FOR MARKING AND IDENTIFYING NEGATIVES.
APPLICATION FILED OCT. 3, 1914.

1,362,581.

Patented Dec. 14, 1920.

WITNESSES:
Charles Pickles
Frances V. Cole

INVENTOR
Carl W. Schmidt
BY G. H. Strong
ATTORNEY

UNITED STATES PATENT OFFICE.

CARL W. SCHMIDT, OF PIEDMONT, CALIFORNIA, ASSIGNOR TO ANSCO COMPANY, OF BINGHAMTON, NEW YORK, A CORPORATION OF NEW YORK.

MEANS FOR MARKING AND IDENTIFYING NEGATIVES.

1,362,581.  Specification of Letters Patent.  Patented Dec. 14, 1920.

Application filed October 3, 1914. Serial No. 864,795.

*To all whom it may concern:*

Be it known that I, CARL W. SCHMIDT, a citizen of the United States, residing at Piedmont, in the county of Alameda and State of California, have invented new and useful Improvements in Means for Marking and Identifying Negatives, of which the following is a specification.

This invention relates to a camera attachment, and pertains especially to a means for marking negatives at the time of taking the picture so that the subsequent identification of the picture is made certain.

The particular object of the invention is to provide a simple practical means for effecting this identification without possible danger to the sensitized medium and without requiring any material alterations in the ordinary camera to which it may be applied.

The invention consists of the parts and the combination and construction of parts as hereinafter more fully described and claimed having reference to the accompanying drawings, in which—

Figure 1:
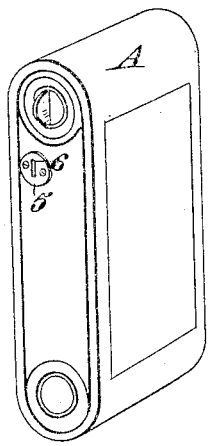
Figure 1 is a perspective of the well known type of camera to which the invention is applied.
Figure 2:
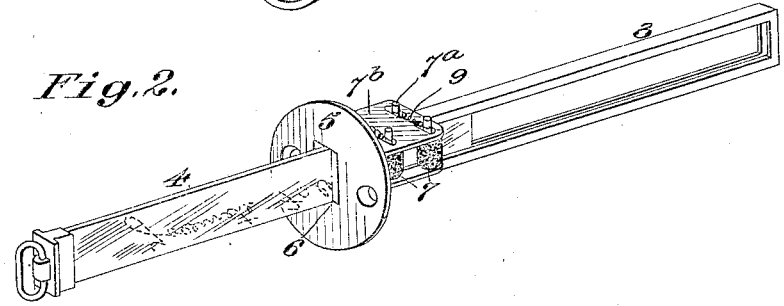
Fig. 2 is a detail of the identifying slide and slide carrier.
Figure 3:
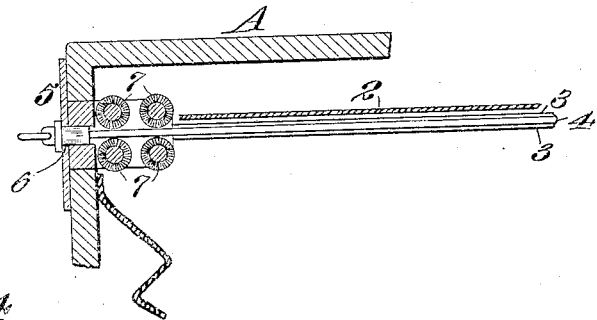
Fig. 3 is a section in plan of a fragment of the camera case.
Figure 4:
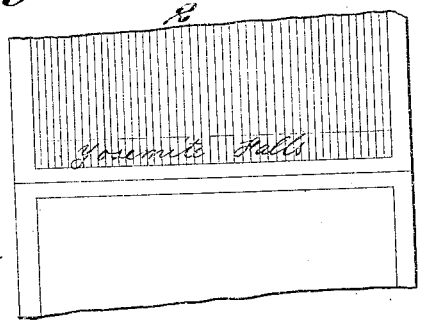
Fig. 4 is a plan of two connected films showing one of them bearing the identifying indicia.

A represents the well known type of camera to which the invention has been successfully applied. This camera is presumed to be provided with the usual bellows and lens and a sensitized film operated in the well known manner, as indicated at 2, Figs. 3 and 4.

At some point in the side of the camera box corresponding to one end of the section of film when in position for exposure, is arranged a transversely extending slideway 3 adapted to guide a translucent long and narrow slide 4, which has such stiffness and density that it will resist the pressure, as of a pencil, when written upon, and also so that it may be thrust into and removed from the camera through suitable light excluding devices, one form of which I describe below. The slideway 3 in practice is adapted to extend crosswise and directly in front of the face of the film, so that light passing through the camera lens during exposure may also pass through the translucent slide 4 and directly imprint upon the sensitive film that which is written upon the slide, which is guided and held by the slideway in front of the face of the film. Preferably the slide 4 is made of ground glass to enable it to more readily receive the writing from the pencil.

The slideway 3 connects with a bushing 5 suitably secured to the side of the camera. This bushing has a slot 6 of sufficient size to receive the slide 4.

Any appropriate means may be employed in conjunction with the bushing and slide to exclude light at all times. In the present instance I have shown two pairs of spaced felt rollers 7, so disposed in relation to each other and to the path traversed by the slide 4 that during the movements of the slide the two pairs of felt rollers will effectively cut off the entrance of light, for, as is well known, no injurious amount can be transmitted lengthwise through the translucent slide itself during the brief time of its insertion and removal from the camera.

In practice, if the operator is about to take a picture, say of the Yosemite Falls, for example, he withdraws slide 4 and writes the words "Yosemite Falls," or other identifying matter thereon and re-inserts it into the camera. He then makes the exposure in the usual way, the words "Yosemite Falls" being light printed simultaneously with the taking of the picture upon the extreme lower edge of the negative, so as not to interfere with the composition of the picture. He then withdraws the slide and erases the words previously written and having adjusted his film in readiness for the next exposure, writes on the slide the name of the picture at the time he is about to take it. This in like fashion is light printed on the succeeding section of film. In this manner a perfect record can be kept of every picture taken without further thought or care on the part of the operator. When the negatives are developed and printed, the finished prints will bear the same indicia as that thus produced on the negatives.

By the term "slide" I mean any character of tablet which has such degree of stiffness and density that it may be evenly written on and also be capable of insertion into the camera and removal therefrom through the light excluding devices for the purpose of light printing directly upon the sensitive medium the matter produced upon said slide.

It is manifest that various changes in the details of construction here shown may be made without departing from the principle of the invention.

Having thus described my invention what I claim and desire to secure by Letters Patent is—

1. The combination with a camera adapted to contain a sensitive surface and having an opening therein closely adjacent to the front of the focal plane, of a translucent slide having sufficient stiffness and density to resist the pressure, as of a pencil, when written upon, and slidable transversely of the camera in front of the sensitive surface and closely contiguous thereto for direct light printing, a slotted plate fixed to the camera through which the slide is slidable, a bushing within the camera contiguous to the plate and compressible rollers within the bushing between which the slide passes.

2. The combination with a camera adapted to contain a sensitive surface and having an opening therein closely adjacent to the front of the focal plane, of a translucent slide having sufficient stiffness and density to resist the pressure, as of a pencil, when written upon, and slidable transversely of the camera in front of the sensitive surface and closely contiguous thereto for direct light printing, a slotted plate fixed to the camera through which the slide is slidable, a bushing within the camera contiguous to the plate, a plurality of compressible rollers disposed in successive pairs, and means by which the rollers of each pair are drawn toward each other.

3. A camera having in addition to its usual coöperating parts, an opening closely adjacent to the front of the focal plane, a translucent slide adapted to receive an inscription and to be inserted into and removed from said opening, and means for excluding the light adapted to have rolling contact with the slide during its insertion and removal.

4. A camera having in addition to its usual coöperating parts, an opening closely adjacent to the focal plane, a slideway in registration with said opening and also closely adjacent to the focal plane, a translucent slide adapted to receive an inscription and to be inserted into said opening and to register with and be guided by said slideway, and compressible light excluding means adapted to have rolling engagement with the slide during its insertion and removal therefrom.

5. A camera having in addition to its usual coöperating parts, an opening closely adjacent to the focal plane, a long and narrow translucent slide adapted to receive an inscription and to be inserted through said opening, means within the camera to guide and support the slide into close engagement with the face of the sensitive material and compressible light excluding devices adapted to engage opposite surfaces of said slide.

6. The combination with a camera adapted to contain a sensitized element and having an opening therein closely adjacent the focal plane, of a long narrow translucent slide having such stiffness and density as to resist the pressure, as of a pencil, when written upon, and adapted to be thrusted endwise through said opening transversely of the camera, said slide being of uniform thickness and of uniform width throughout, and tightly-hugging light excluding means wholly within the camera and operably associated with said slide whereby to exclude substantially all light, both when the slide is in operative position and while the same is being inserted and removed 7. In combination with a camera having in addition to its usual coöperating parts, an opening adjacent the focal plane, of an inscription-bearing slide comprising a long and narrow translucent strip upon which an inscription may be readily made and from which it may be readily removed, and of equal thickness throughout, said slide having sufficient stiffness and density to resist the pressure, as of a pencil, when written upon, and that it may without other support than itself be thrust endwise through said opening into the interior of the camera.

8. In combination with a camera having in addition to its usual coöperating parts, an opening adjacent the focal plane, of an inscription-bearing slide comprising a long and narrow translucent strip upon which an inscription may be readily made and from which it may be readily removed, and of equal thickness throughout, said slide having sufficient stiffness and density to resist the pressure, as of a pencil, when written upon, and that it may without other support than itself be thrust endwise through said opening into the interior of the camera, and means wholly within the camera coöperating with said slide to exclude substantially all light, both when the slide is in operative position and while the same is being inserted and removed.

In testimony whereof I have hereunto set my hand in the presence of two subscribing witnesses.

CARL W. SCHMIDT

Witnesses:
 G. L. Schmidt,
 R. P. Bromley.